(12) United States Patent
Versluis

(10) Patent No.: US 8,469,165 B2
(45) Date of Patent: Jun. 25, 2013

(54) INTERCONNECTING STRUT FOR ARRANGING BETWEEN ADJACENT LANDING FLAPS OF AN AIRCRAFT

(75) Inventor: Susanne Versluis, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 537 days.

(21) Appl. No.: 12/226,622

(22) PCT Filed: Apr. 27, 2007

(86) PCT No.: PCT/EP2007/054136
§ 371 (c)(1),
(2), (4) Date: Jan. 29, 2009

(87) PCT Pub. No.: WO2007/128708
PCT Pub. Date: Nov. 15, 2007

(65) Prior Publication Data
US 2009/0152064 A1   Jun. 18, 2009

Related U.S. Application Data

(60) Provisional application No. 60/797,331, filed on May 3, 2006.

(30) Foreign Application Priority Data

May 3, 2006 (DE) .......................... 10 2006 020 554

(51) Int. Cl.
*F16F 7/12* (2006.01)

(52) U.S. Cl.
USPC ................................. 188/376; 267/71; 267/74

(58) Field of Classification Search
USPC .. 188/284, 297, 312, 371, 372, 376; 267/196, 267/201, 202, 203, 293, 294, 35, 70, 71, 267/73, 74, 138; 16/86 R, 86 A, 86 B
See application file for complete search history.

(56) References Cited

U.S. PATENT DOCUMENTS 2,642,845 A * 6/1953 Stevens .......................... 188/313
2,783,039 A * 2/1957 Wilson ........................... 267/138

(Continued)

FOREIGN PATENT DOCUMENTS

DE   3505839   8/1986
DE   3522449   2/1987

(Continued)

OTHER PUBLICATIONS

Decision on Granting from the Federal Service for Intellectual Property, Patents and Trademarks (ROSPATENT) in the parallel Russian application 2008142965/11(055910).

*Primary Examiner* — Thomas J Williams
(74) *Attorney, Agent, or Firm* — Greer, Burns & Crain, Ltd.

(57) ABSTRACT

An interconnecting strut includes two coaxially arranged strut elements which may be displaced relative to one another in the longitudinal direction of the interconnecting strut, two end stops defining the mutual displaceability of the two strut elements, as well as damping elements, which when a specific permissible displacement is exceeded, damp the displacement movement of the strut elements before reaching the end stops, in which the damping elements consist of a material which is plastically deformable in the occurring force range, the damping elements being compressed for damping the displacement movement in the longitudinal direction and, at the same time, being subjected to a cross-sectional enlargement transversely to the longitudinal direction, due to the compression.

12 Claims, 4 Drawing Sheets

U.S. PATENT DOCUMENTS

| | | | |
|---|---|---|---|
| 3,605,553 A * | 9/1971 | Panigati | 188/284 |
| 3,819,167 A | 6/1974 | Nakamura et al. | |
| 4,336,868 A | 6/1982 | Wilson et al. | |
| 4,821,983 A | 4/1989 | Aubry et al. | |
| 4,838,393 A * | 6/1989 | Mourray et al. | 188/284 |
| RE33,696 E * | 9/1991 | Stevenson | 267/33 |
| 7,441,637 B2 * | 10/2008 | Fukushima et al. | 188/284 |
| 2004/0056469 A1* | 3/2004 | Karaki et al. | 280/784 |
| 2005/0179184 A1* | 8/2005 | Kojima et al. | 267/201 |
| 2007/0147910 A1* | 6/2007 | Kamei et al. | 399/307 |

FOREIGN PATENT DOCUMENTS

| | | |
|---|---|---|
| DE | 3546236 A1 * | 7/1987 |
| RU | 1768818 | 10/1992 |
| RU | 1809885 | 4/1993 |
| SU | 358560 | 11/1972 |
| SU | 846886 | 7/1981 |
| SU | 1326815 | 7/1987 |
| SU | 1710887 | 2/1992 |
| WO | WO 97/10145 | 3/1997 |

* cited by examiner

INTERCONNECTING STRUT FOR ARRANGING BETWEEN ADJACENT LANDING FLAPS OF AN AIRCRAFT

FIELD OF INVENTION

The invention relates to an interconnecting strut for arranging between adjacent landing flaps of an aircraft.

BACKGROUND OF INVENTION

Large aircraft, such as for example commercial or transport aircraft, comprise on each of their supporting surfaces a plurality of similar flaps which act in a similar manner and which are to be driven synchronously. Such flaps are, for example, the landing flaps arranged on the rear edge of the supporting surface. Said landing flaps are generally divided into inner, outer and central landing flaps and are driven by means of separate flap drive units. In order not to diminish the flight safety in the event of malfunction of a flap drive unit, adjacent flaps are coupled by means of so-called interconnecting struts. Said interconnecting struts are designed such that adjacent flaps carry out different movements within a specific permissible movement range and are able to adopt different positions, for example in order for different adjusting speeds, different dynamic loads, as well as different kinematics of adjacent flaps to be achieved. If, for example, a flap drive unit fails, the flaps are initially still able to be moved within the permissible movement range, depending on the flight situation. This permissible movement range is, in this connection, fixed from an aerodynamic point of view, stalling not being allowed to occur on any of the flaps. If the permissible movement range is exceeded, metal end stops arranged on the interconnecting strut and damping elements damping the displacement movement against these end stops ensure that adjacent flaps are only able to adopt different positions to a limited extent. An exceeding of the movement range may be detected by means of sensors arranged on the interconnecting struts and a corresponding warning signal emitted. The warning signal informs the pilot about the malfunction, whereupon said pilot is no longer allowed to move the flaps. The flap drive units are, therefore, stopped in the respective position and, as a result of which, the flaps are fixed.

An interconnecting strut typically comprises two coaxially arranged strut elements which may be displaced freely relative to one another within a permissible range in the longitudinal direction of the interconnecting strut. The permissible displacement between the strut elements is, in this case, adapted to the permissible movement range between the adjacent flaps. Moreover, the interconnecting strut has end stops defining the displaceability of the strut elements, as well as damping elements damping the impact against the end stops. If the permissible displacement between the two strut elements is exceeded, the displacement movement between the strut elements is damped by the damping elements before reaching the end stops.

In order to damp the displacement movement and, in particular, the impact of the two strut elements against their end stops, for example in the event of a broken connection between the flap drive unit and flap, the damping elements are of multipart construction, made up of a tube and a spherical segment. The tube and the spherical segment are, in this case, coaxially arranged in tandem in the longitudinal direction of the interconnecting strut between the two strut elements. If the permissible displacement between the strut elements is exceeded, the displacement movement is damped. The tube is, in this case, partially plastically and partially elastically expanded by the spherical segment, radially from the inside against the strut element located coaxially on the outside. At the same time, the spherical segment is pressed radially inwardly by the tube against the strut element located coaxially on the inside.

An interconnecting strut is shown by way of example in FIG. 4. The interconnecting strut 100 comprises two coaxially arranged strut elements 200, 210, which may be displaced relative to one another in the longitudinal direction L of the interconnecting strut 100. In order to be able to establish whether the permissible displacement of the two strut elements 200, 210 relative to one another has been exceeded, sensors 400 are arranged on the strut element 200 located coaxially on the outside, which detect the position of a transmitter element 420 connected to the strut element located coaxially on the inside. A damping element 300 is arranged coaxially between the strut elements 200, 210. The damping element 300 of the interconnecting strut 100 shown in FIG. 4 is suitable for damping displacement movements, which are produced both by tensile forces and by compressive forces acting on the interconnecting strut 100. To this end, the damping element 300 consists of a tube 320 and a spherical segment 340 adapted to the diameter of the tube 320. The damping element is arranged between two retaining elements 500, 510. The retaining elements 500, 510 are arranged between two stop surfaces 600, 610 arranged on the strut element 200 located coaxially on the outside. The two retaining elements 500, 510 may be moved towards one another by pressing in the spherical portion 340, on the front face, into the tube 320, on which one respective collar 700, 710 is arranged on both sides of the retaining elements 500, 510 on the strut element 210 located coaxially on the inside. The spacings on both sides between the retaining elements 500, 510 and the collar 700, 710 correspond to the permissible displacement of the two strut elements 200, 210 relative to one another. If the permissible displacement in one of the two directions is exceeded, one respective collar 700, 710 impacts against one of the two retaining elements 500, 510 and moves said retaining elements towards one another by pressing in the spherical segment 340, on the front face, into the tube 320. As a result, the displacement movement between the two strut elements 200, 210 is damped before reaching the end stops.

A drawback with this exemplary interconnecting strut, is firstly the high weight, in particular produced by the high weight of the damping elements, which are to be produced from steel. Moreover, the construction cost for producing the interconnecting strut, in particular for producing the damping elements, is very high as a result of the required choice of material and the accuracy of fit of the spherical segment and tube.

SUMMARY OF THE INVENTION

An object of the invention is to develop an interconnecting strut with a simpler construction as well as a reduced weight.

This object is achieved with an interconnecting strut according to the invention according to claim 1, by the damping means consisting of a plastically deformable material in the occurring force range, the damping means being compressed for damping the displacement movement in the longitudinal direction and, at the same time, being subjected to a cross-sectional enlargement transversely to the longitudinal direction, by means of the compression. By utilizing the combined effect of compression and the resulting cross-sectional enlargement, it is possible, for example, to produce the damping elements forming the damping mean(s) in one piece, which considerably reduces the cost of construction. Moreover, any materials able to be plastically deformed in the occurring force range may be used for the damping means, and as a result of which the production cost may be further reduced. By the use of a material which may be plastically deformed in the occurring force range, it is ensured that the cross-sectional enlargement is continually maintained and the kinetic energy absorbed during the compression is not released again.

The interconnecting strut according to the invention, has the advantage that, for example, the damping element(s) forming the damping means, is/are able to be designed in one piece, as by the combination of compression and the resulting cross-sectional enlargement a large amount of kinetic energy is able to be absorbed by the damping elements in order to damp the displacement movement. As a result, relative to the prior art, it is no longer necessary to have two parts forming the damping elements which interact with one another but now only one part. The combination of compression and cross-sectional enlargement of a damping element designed in one piece, moreover, allows the use of non-ferrous metallic materials and also non-metallic materials for the damping means, which are more lightweight than the previously used steels. As a result, the weight as well as the cost of construction is considerably reduced for producing the interconnecting strut according to the invention, relative to the known interconnecting struts. Moreover, the combination of compression and resulting cross-sectional enlargement ensures that very large forces are borne by the damping elements.

One advantageous embodiment of the invention provides that the damping means are arranged coaxially between the two strut elements. Preferably, at the same time the damping means comprise means for mutually guiding the two strut elements arranged coaxially in one another, during normal operation, within the range of permissible displacement.

A particularly advantageous embodiment of the invention provides that the damping means respectively comprise a damping element for tractive and compressive forces acting on the interconnecting strut when the permissible displacement is exceeded. In this connection, a first damping element serves exclusively for damping the displacement movement produced by compressive force acting on the interconnecting strut. The design with separate damping elements for tractive and compressive forces is, in particular, advantageous with relatively long struts as, consequently, the cost of construction for arranging the damping elements is very low. Preferably, in this connection, the damping elements are fixedly arranged on one of the two strut elements by means of one respective retaining element, one of the two damping elements respectively arranged on a retaining element impacting against a stop surface arranged on the other strut element, when the permissible displacement is exceeded and being compressed by simultaneous cross-sectional enlargement for damping the displacement movement. The end stops may, in this case, be formed by the retaining elements and the associated stop surfaces. In this case, exceeding the permissible displacement for damping the displacement movement firstly presses the respective damping element against the respective stop surface, the respective retaining element and the associated stop surface subsequently forming the respective end stop. It is also conceivable that before the impact of a retaining element against the respective stop surface, the two strut elements come directly into contact with one another and thus form the end stops.

A further particularly advantageous embodiment of the invention provides that the damping means comprise a common damping element for tractive and compressive forces acting on the interconnecting strut when the permissible displacement is exceeded. In this connection, one and the same damping element serves for damping the displacement movement produced by tensile forces acting on the interconnecting strut and for damping the displacement movement produced by compressive forces acting on the interconnecting strut. The design with a common damping element for tractive and compressive forces is, in particular, advantageous with relatively large permissible displacements between the strut elements. Preferably, in this case, the damping element is arranged between two retaining elements, which are arranged to be displaceable towards one another between two stop surfaces arranged on one of the two strut elements by compressing the damping element, on the other strut element on both sides of the retaining elements one respective collar being arranged on respectively one of the two retaining elements, spaced apart from the retaining elements by the total permissible displacement, so that when the permissible displacement of the strut elements relative to one another is exceeded, depending on the direction of force, one or the other collar impacts respectively against one of the two retaining elements, whereby the two retaining elements are moved towards one another and the damping element arranged between the retaining elements is compressed for damping the displacement movement with simultaneous cross-sectional enlargement.

A further advantageous embodiment of the invention provides that the damping element is in one piece. The combination of compression and cross-sectional enlargement transversely to the longitudinal direction allows a very simple structural design of the damping element so that a one-piece design is possible.

An additional advantageous embodiment of the invention provides that the damping element comprises a preferably hollow cylindrical-shaped ring made from a material which may be plastically deformed in the occurring force range. For damping the resulting impact when the permissible displacement is exceeded, the ring preferably further comprises a transitional stage.

According to one advantageous embodiment of the invention, the damping element is produced from fibre reinforced plastics. It is also conceivable that the damping element consists of wound fibre reinforced plastics. Preferably the fibre reinforced plastics is carbon fibre reinforced plastics (CFRP). The structure of components made from fibre reinforced plastics may be specifically designed for specific types of load. Moreover, fibre reinforced plastics are able to absorb a very high amount of deformation energy in a controlled manner.

One advantageous embodiment of the invention comprises means for detecting the displacement of the strut elements relative to one another, a warning signal being generated when the permissible displacement is exceeded, before a further actuation of adjacent flaps connected to one another by the interconnecting strut. The means for detecting the displacement of the strut elements may, for example, comprise at least one sensor arranged on the one strut element, preferably located coaxially on the outside, as well as a transmitter element arranged on the other strut element, preferably located coaxially on the inside, which may be detected by the sensor. The transmitter element and the sensor are, in this case, displaced relative to one another together with the displacement of the strut elements. The transmitter element, also denoted as a target, is therefore preferably designed such that in addition to exceeding the permissible displacement, smaller displacements within the permissible range may also be detected, so that during normal operation different positions between the flaps may also be detected, for example in order to be able to identify an error or a threatened failure of a flap drive unit in good time.

BRIEF DESCRIPTION OF THE DRAWINGS

The invention is described in more detail hereinafter with reference to an embodiment and with reference to the drawings, in which.

DETAILED DESCRIPTION OF THE DRAWINGS

Figure 1:
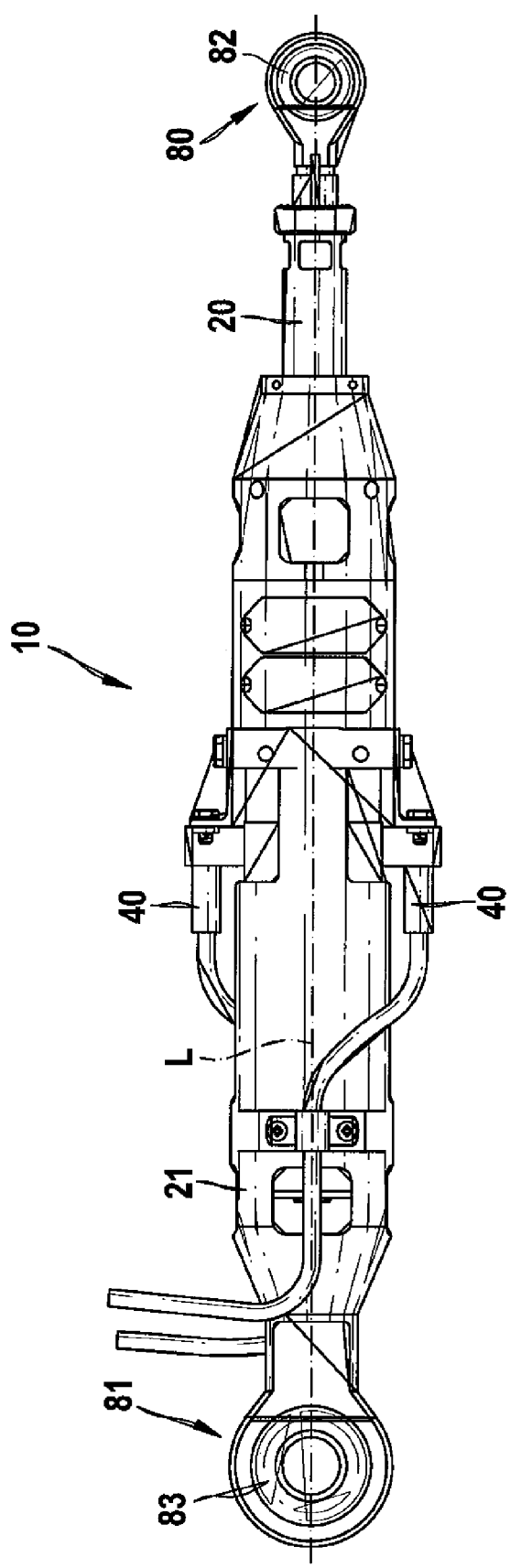
FIG. 1 shows a side view of an interconnecting strut according to one embodiment of the invention.

An interconnecting strut 10 shown in FIG. 1 consists of two coaxially arranged strut elements 20, 21 which may be freely displaced relative to one another in the longitudinal direction L of the interconnecting strut 10 within a permissible range. On the free ends 80, 81 of the strut elements 20, 21 spaced apart from one another, one respective head 82, 83 is arranged, for connecting to respectively one of two adjacent landing flaps, not shown. On the strut element 21 located coaxially on the outside, two sensors 40 are arranged on the outside, which are able to detect the position of a transmitter element 42 shown in FIG. 2 connected to the strut element 21 located coaxially on the inside and arranged coaxially between the two strut elements 20, 21. If a maximum permissible displacement between the strut elements 20, 21 is exceeded in the tractive direction or in the compressive direction, this is identified by the sensors 40 and a corresponding warning signal is forwarded to the cockpit of the aircraft. Immediately, a warning is emitted in the cockpit which communicates the failure of a flap drive unit and prevents a further movement of the flaps. In principle, however, it is also conceivable that different positions between the flaps are detected by means of sensors which are not arranged on the connecting struts 10, for example by means of optical sensors arranged on the front face of the flaps.

Figure 2:
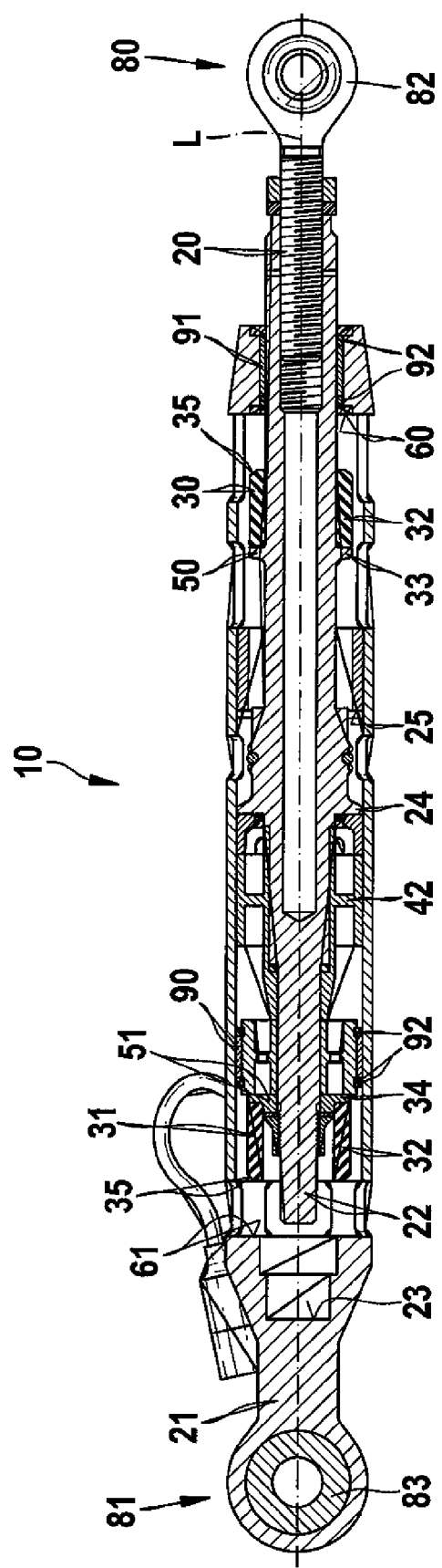
FIG. 2 shows a longitudinal section through the interconnecting strut of FIG. 1 with separate damping elements for tractive and compressive forces acting on the interconnecting strut.

It may be seen in FIG. 2 how the two strut elements 20, 21 are arranged coaxially. Guide elements 90, 91 are arranged coaxially between the two strut elements 20, 21 and which displaceably connect the two strut elements 20, 21 in the longitudinal direction L of the interconnecting strut 10 to one another. In this connection, a guide element 90 is fixedly arranged on the end of the strut element 20 located coaxially on the inside, facing away from the free end 80, and the second guide element 91 is fixedly arranged on the end of the strut element located coaxially on the outside, facing away from the free end 81. Between the guide elements 90, 91 and the respective strut elements 21, 20 which may be displaced relative thereto are arranged scraper rings 92 which keep the mating surfaces clean and protect the sliding surface. The connecting strut 10 shown in FIG. 2 comprises two damping elements 30, 31. In this case, the first damping element 30 exclusively serves for damping a displacement movement produced by tensile forces acting on the interconnecting strut 10, and the second damping element 31 exclusively serves for damping a displacement movement produced by compressive forces acting on the interconnecting strut 10. The damping elements 30, 31 respectively consisting of a ring 32 are fixedly arranged on the strut element 20 located coaxially on the inside by means of one respective retaining element 50, 51. The retaining element 50, on which the damping element 30 is arranged, consists, for example, of a collar 33, whereas the retaining element 51 for the damping element 31 consists of a disc 34 with shoulders adapted to the ring 32. When exceeding the permissible displacement, one of the two damping elements 30, 31 impacts, depending on the direction of displacement, against a stop surface 60, 61 arranged on the strut element 21 located coaxially on the outside and is compressed for damping the displacement movement, with simultaneous cross-sectional enlargement. In order to reduce the impact of the damping elements 30, 31 on the stop surfaces 60, 61, transitional stages 35 are formed on the rings 32 forming the damping elements 30, 31. On the strut element 20 located coaxially on the inside, moreover, the transmitter element 42 is fixedly arranged which may be detected by the sensors 40 shown in FIG. 1. The heads 82, 83 are arranged on the free ends 80, 81 of the strut elements 20, 21.

In particular with long interconnecting struts 10, one respective damping element 30, 31 is used for tractive and compressive forces, as shown in FIG. 2. Thus the construction of the interconnecting strut 10 may be simplified. A signal is transmitted into the cockpit about the position of the transmitter element 42 relative to the sensors 40, when the permissible displacement is exceeded. The flaps are then no longer able to be moved. In order to suppress the error, depending on the direction of force, the damping elements 30, 31 come into contact with the stop surfaces 60, 61, the damping element 30 coming into contact with the stop surface 60 with tensile forces and the damping element 31 coming into contact with the stop surface 61 with compressive forces. The damping elements 30, 31 may be respectively compressed by 20 mm for damping the displacement movement and namely radially inwardly with simultaneous cross-sectional enlargement and outwardly, transversely to the longitudinal direction L of the interconnecting strut 10. In this connection, the damping elements 30, 31 may absorb a force of 120 kN. It subsequently reaches a metallic end stop, the bar 22 of the strut element 20 impacting against the impact surface 23 of the strut element 21 with compressive forces and the collar 24 arranged on the strut element 20 impacting against the impact surface 25 of the strut element 21 with tensile forces. The two impact surfaces 23, 25 therefore serve as end stops.

Figure 3:
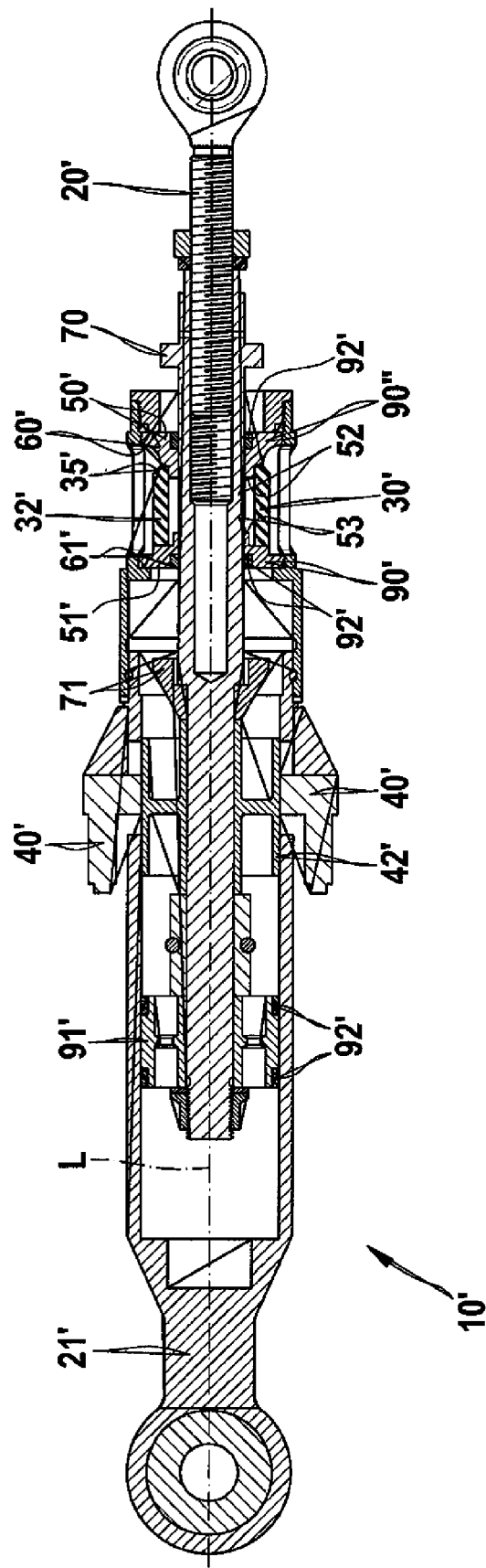
FIG. 3 shows a longitudinal section through an interconnecting strut according to an embodiment of the invention with a common damping element for tractive and compressive forces acting on the interconnecting strut.
Figure 4:
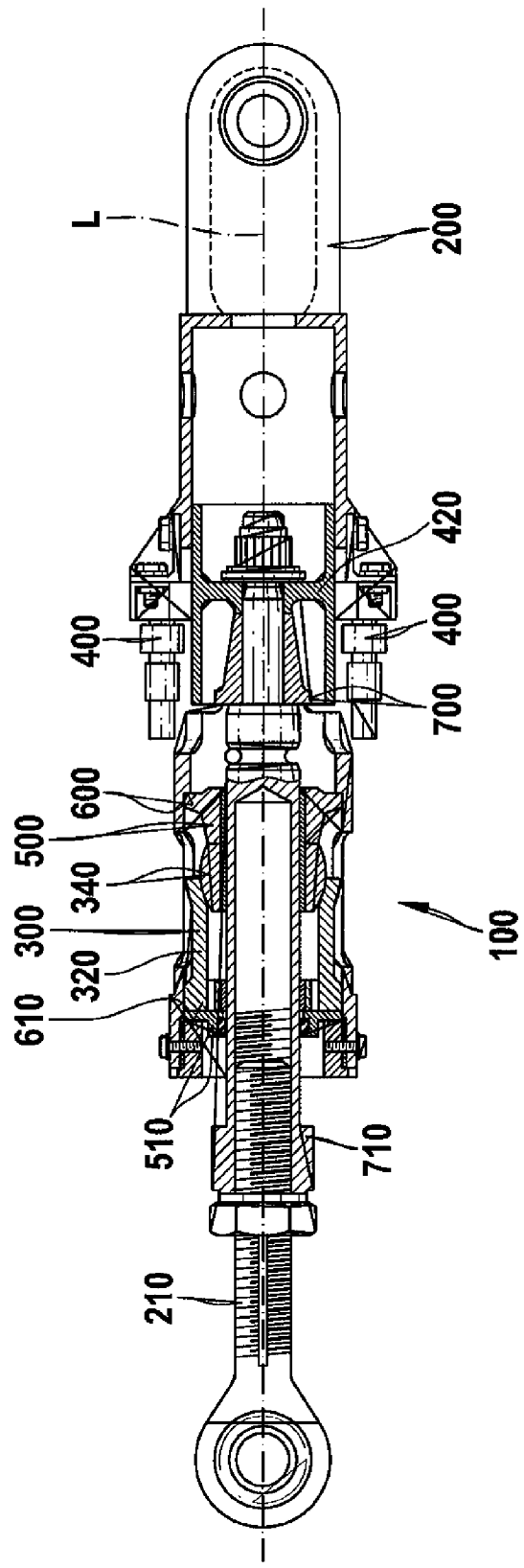
FIG. 4 shows a longitudinal section through an interconnecting strut by way of example with a multipart damping element.

An embodiment of an interconnecting strut 10' according to the invention is shown in FIG. 3 with a common damping element 30' for tractive and compressive forces acting on the interconnecting strut 10' when the permissible displacement is exceeded. The interconnecting strut 10' comprises, in turn, two coaxially arranged, mutually displaceable strut elements 20', 21'. The damping element 30' is arranged coaxially between the strut elements 20', 21'. The design with a common damping element 30' for tractive and compressive forces is advantageous, in particular with relatively large permissible displacements between the strut elements 20', 21'. The damping element 30' is arranged between two retaining elements 50', 51', which are arranged between two stop surfaces 60', 61' arranged on the strut element 21 located coaxially on the outside. The two retaining elements 50', 51' may be moved towards one another by compression of the damping element 30'. On the strut element 20' located coaxially on the inside, one respective collar 70, 71 respectively acting on one of the two retaining elements is arranged on both sides of the retaining elements 50', 51'. The sum of the spacings of the two collars 70, 71 from the associated retaining elements 50', 51' corresponds, therefore, to the permissible displacement. If the permissible displacement between the two strut elements 20', 21' is exceeded, depending on the direction of force, the one or the other collar 70, 71 impacts respectively against one of the two retaining elements 50', 51', whereby the two retaining elements 50', 51' may be moved towards one another and the damping element 30' arranged between the retaining elements 50', 51' is compressed for damping the displacement movement with simultaneous cross-sectional enlargement. The damping element 30' consists of a ring 32'. The ring 32' comprises a transitional stage 35' in order to reduce the impact when the permissible displacement is exceeded.

The interconnecting strut 10' shown in FIG. 3, also comprises a transmitter element 42' fixedly connected to the strut element 20' located coaxially on the inside, which may be detected by two sensors 40' arranged externally on the strut element 21' located coaxially on the outside. If the permissible displacement between the strut elements 20', 21' is exceeded, this is identified by the sensors 40 and a signal forwarded into the cockpit. The flaps are then no longer able to be moved. In order to suppress the error, the damping element 30' arranged between the two retaining elements 50', 51' is now compressed—depending on the direction of force—by the collar 70 or 71 impacting against the stop surface 60' on the retaining element 50' or against the stop surface 61' on the retaining element 51' and the two retaining elements 50', 51' are moved towards one another. The damping element 30' may, therefore, be deformed by 30 mm, until the two retaining elements impact against one another with their impact surfaces 52, 53. Until the two impact surfaces 52, 53 of the retaining elements 50', 51' impact against one another, the damping element 30' is compressed to such an extent that it has undergone a plastic cross-sectional enlargement radially inwardly and radially outwardly.

The flaps are then held in the respective position by switching off the flap drive units. The two impact surfaces 52, 53 of the retaining elements 50', 51' thus form the end stops, which define the displaceability of the strut elements 20', 21' relative to one another. The retaining elements 50', 51' of the interconnecting strut 10' serve, therefore, simultaneously as guide elements 90', 90". For stabilization, a further guide element 91' is arranged coaxially between the strut elements 90', 90", 91' and scraper rings 92', which preferably consist of teflon and which are respectively pressed by a silicon ring against the mating surface, are arranged on all guide points which have to be kept clean and protected from dirt and the formation of ice.

It is noteworthy that the damping elements 30, 31 and 31' in FIGS. 1 to 3, allow respective specific damping lengths via which the displacement movement between the strut elements is damped before reaching the metallic end stops. These damping lengths are preferably between 20 and 30 mm. It only reaches a metallic end stop between the strut elements 20 and 21 and/or 20' and 21' if the damping length is used up and/or collided with. These end stops are formed with tensile forces acting on the interconnecting strut in FIG. 2 by the collar 24 and the impact surface 25 and in FIG. 3 by the collar 70, which pushes the retaining element 50' onto the impact surface 53. With compressive forces acting on the interconnecting strut, the end stops in FIG. 2 are formed by the bar 22 and the impact surface 23 and in FIG. 3 by the collar 71, which pushes the retaining element 51' onto the impact surface 52.

What is claimed is:

1. An interconnecting strut with two coaxially arranged strut elements which may be displaced relative to one another in the longitudinal direction of the interconnecting strut, two end stops defining the mutual displaceability of the two strut elements, as well as damping means for damping the displacement movement of the strut elements when a specific permissible displacement is exceeded before reaching the end stops, the damping means comprising a plastically deformable material, the damping means being compressible in the longitudinal direction for damping the displacement movement and when compressed being subjected to a cross-sectional enlargement radially inwardly and radially outwardly transversely to the longitudinal direction, the damping means comprise a common damping element for tractive and compressive forces acting on the interconnecting strut when the permissible displacement is exceeded.

2. The interconnecting strut according to claim 1, characterized in that the damping means are arranged coaxially between the two strut elements.

3. The interconnecting strut according to claim 1, characterized in that the damping means comprise guiding means for the two strut elements arranged coaxially in one another, within the range of permissible displacement.

4. The interconnecting strut according to claim 1, characterized in that the damping element is arranged between two retaining elements which are arranged to be displaceable towards one another between two stop surfaces arranged on one of the two strut elements by compressing the damping element, on both sides of the retaining elements respectively one collar, acting on one of the two retaining elements, being arranged on the other strut element, so that when the permissible displacement is exceeded, depending on the direction of force, one of the two collars impacts against one of the two retaining elements.

5. The interconnecting strut according to claim 1, characterized in that the damping element is in one piece.

6. The interconnecting strut according to claim 1, characterized in that the damping element comprises a ring.

7. The interconnecting strut according to claim 6, characterized in that the ring comprises a transitional stage.

8. The interconnecting strut according to claim 1, characterized in that the damping element is produced from fibre reinforced plastics.

9. The interconnecting strut according to claim 8, characterized in that the fibre reinforced plastics material is carbon fibre reinforced plastics (CFRP).

10. The interconnecting strut according to claim 1, characterized in that the damping element comprises wound fibre reinforced plastics.

11. The interconnecting strut according to claim 1, characterized by means for detecting the displacement of the strut elements relative to one another, a warning signal being generated when the permissible displacement is exceeded.

12. The interconnecting strut according to claim 11, characterized in that the means for detecting the displacement of the strut elements comprise at least one sensor arranged on the one strut element as well as a transmitter element arranged on the other strut element which may be detected by the sensor.

* * * * *